Patented Apr. 14, 1953

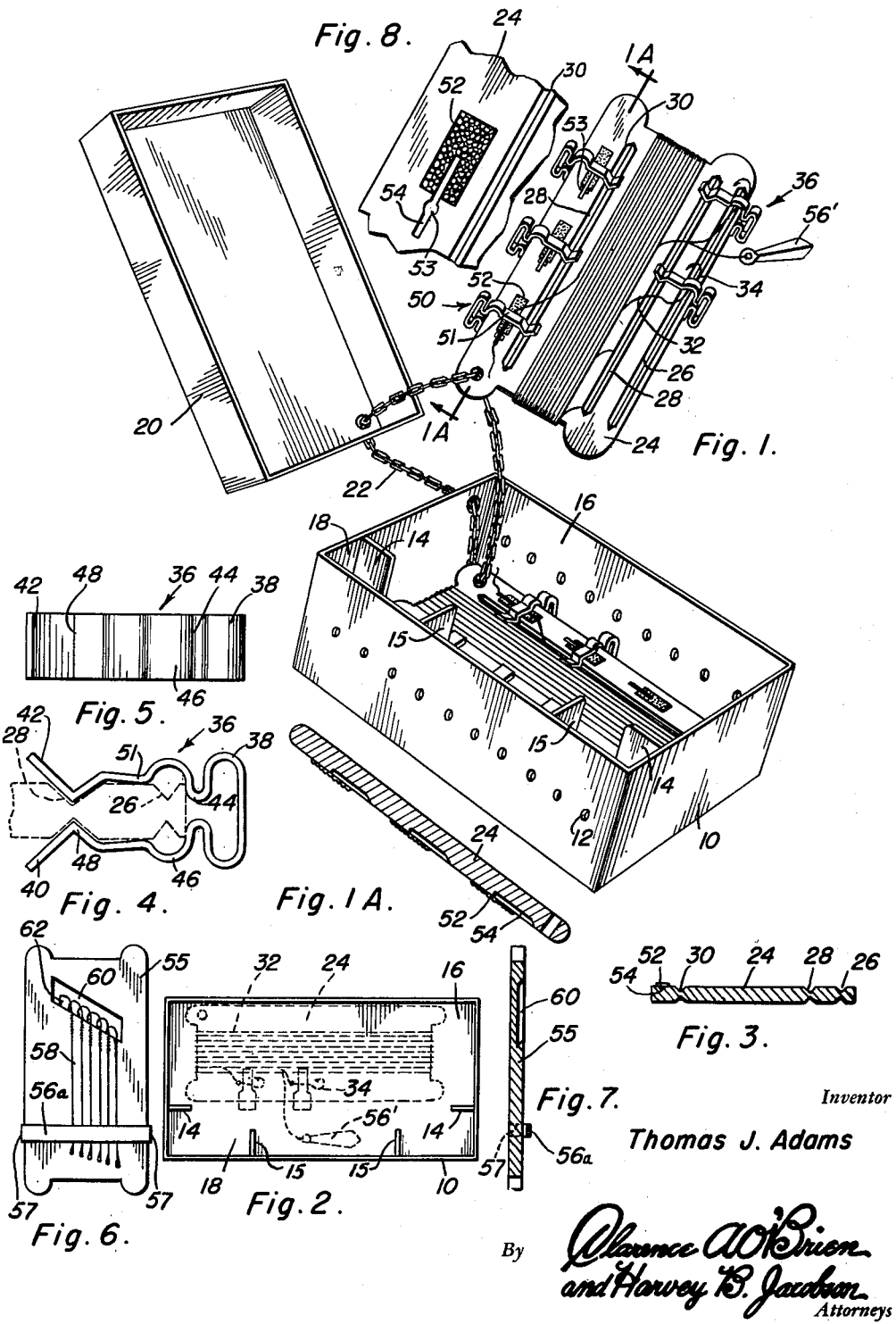

2,634,541

UNITED STATES PATENT OFFICE 2,634,541

FISHING KIT

Thomas J. Adams, Manitowoc, Wis.

Application September 2, 1947, Serial No. 771,749

1 Claim. (Cl. 43—57.5)

This invention relates to new and useful improvements in fishing kits and the primary object of the present invention is to provide a device that will conveniently support a large number of leader holding slats, and including novel and improved means for engaging and retaining in a safe position hooks carried by the leaders that are wound upon the slats.

Another important object of the present invention is to provide a kit divided into a pair of chambers wherein one of said chambers can receive a large number of line supporting slats and the other of said chambers may receive a plurality of sinkers, spinners, flies and the like.

A further object of the present invention is to provide a fish kit including a plurality of line holding members and means carried by said members for engaging the free ends of the lines to prevent the loss of the lines from the slats.

A still further aim of the present invention is to provide a fishing kit that is simple and practical in construction, strong and reliable in use, neat and attractive in appearance, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a perspective view of the present invention, showing the cover and one of the line supporting slats removed from the container;

Figure 1A is a longitudinal vertical sectional view taken substantially on the plane of the section line 1A—1A of the slat shown in Figure 1 with the slat inverted, and with parts removed therefrom;

Figure 2 is a top plan view of the container used in conjunction with the present invention, and with dotted lines showing the line holding slats in position thereto;

Figure 3 is a transverse vertical sectional view taken substantially through the center of one of the line holding slats;

Figure 4 is a side elevational view of one of the hook engaging members, and with dotted lines showing one side of the line holding slat supporting the same;

Figure 5 is a plan view of Figure 4;

Figure 6 is a plan view showing the line holding slat in slightly modified form;

Figure 7 is a longitudinal vertical sectional view taken substantially through the center of Figure 6; and Figure 8 is an enlarged fragmentary plan view of the slat shown in Figure 1, and with parts broken away and shown in section.

Referring now to the drawings in detail, wherein for the purpose of illustration there is disclosed a preferred embodiment of the present invention, the numeral 10 represents a substantially rectangular container or receptacle open at one end and provided with a plurality of apertures 12 in its side wall for ventilation of the interior of the receptacle. A pair of longitudinally disposed partitions or spacer plates 14 carried by the opposite ends of the receptacle, and a further plurality of transverse plates 15 at one side of the receptacle, divide the same into a slat chamber 16 and a sinker chamber 18. This receptacle 10 is provided with a removable closure 20 which is loosely connected to the receptacle by an endless chain 22.

The numeral 24 represents a plurality of similar slats that are slidably mounted at one corner on the chain 22. These slats are each provided with a pair of spaced parallel, longitudinally, substantially V-shaped grooves 26 and 28 on each face adjacent one side and with a further longitudinally, substantially V-shaped groove 30 adjacent their opposite sides and on both faces of the slats.

A plurality of fishing lines 32 are wound longitudinally about each of the slats and these lines are provided with hooks 34 at one of their terminals that engage grooves 26.

The numeral 36 represents the resilient clips generally which are used in conjunction with the present invention to provide means for engaging the hooks 34, and for a further purpose which will later be described. These clips 36 are formed from a single piece of resilient material bent to form a finger gripping loop 38 intermediate its ends. The legs 40 and 42 of the clips are then bent to provide portions 44 that frictionally bear against the side edges of the slats. The legs 40 are also bent to provide substantially semi-circular portions 46 that register with the grooves 26. The terminals of the legs 40 and 42 are inclined inwardly and then outwardly to provide V-shaped portions 48 that are slidably mounted in grooves 28.

A plurality of these clips are also used on the opposite side of the slat and for the purpose of description, these latest mentioned clips will be referred to by the numeral 50.

Longitudinally spaced, raised or roughened areas 52 are provided on the outer face of the slat adjacent and parallel to the grooves 30 and engage the free terminals of the lines 32. Passages 54 are provided in the outer face of the slats and extend into roughened areas at one end to receive the free ends of the lines 32, with the roughened areas preventing slipping of the free ends of the lines when the clips 50 are pushed upon the slat whereupon the flat portions 51 of the clips bear on the line engaged upon the roughened areas.

It should be noted, that passages 53, shown in Figure 8, are provided in grooves 54 adjacent areas 52 to accommodate hooks or the like which may be carried by the snells wound about the slats.

In practical use of the device, these slats are placed one upon the other in the chamber 16, with the sinkers 56' carried by the lines 32 positioned in the chamber 18, so that a greater number of slats may be conveniently placed in the chamber 16 without having the sinkers rest between the slats and reduce the available space of the chamber 16. The hooks 34 will lie in the grooves 26 on either or both faces of the slats and will be held thereby by the portions 46 of the clips 36. The free ends of the lines 32 may be clamped by the clips 50 against the roughened areas 52 by the flat portions 51 of the clips with the portion of the free ends positioned in passages 54 for convenient accessibility or handling thereof by the user as shown in Figure 1.

Reference is now directed to Figures 6 and 7, wherein there is disclosed the slat 55 in slightly modified form, in this embodiment, a transverse spring 56a has its end portions 57 turned downwardly to slidably engage the side edges of the slats 55 and to clamp one end of a plurality of leaders or snells 58 against the slat. An inclined recess portion 60 is provided in one face of the slat 55 to engage the hooks 62 carried by the leaders for retaining the same in a safe position.

In view of the foregoing description taken in conjunction with the accompanying drawings it is believed that a clear understanding of the construction, operation and advantages of the device will be apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

Having described the invention, what is claimed as new is:

A fish line holding device comprising a slat having a V-shaped groove therein, a roughened area adjacent the groove and an elongated recess paralleling the groove and extending into the roughened area, a fish line on the slat having an end overlying the roughened area and passing through the recess, and a substantially U-shaped clip engaged over an edge of the slat adjacent the groove and having a flat portion engaging and holding the end of the line against the roughened area and said clip also having a V-shaped portion on one limb adapted to be received in the groove.

THOMAS J. ADAMS.

References Cited in the file of this patent

UNITED STATES PATENTS

| Number | Name | Date |
|---|---|---|
| 218,719 | Doyle | Aug. 19, 1879 |
| 423,678 | Fancourt | Mar. 18, 1890 |
| 444,272 | Benn | Jan. 6, 1891 |
| 539,127 | Gump | May 14, 1895 |
| 649,816 | Davis | May 15, 1900 |
| 868,746 | York | Oct. 22, 1907 |
| 946,119 | Field | Jan. 11, 1910 |
| 1,076,894 | Langbein | Oct. 28, 1913 |
| 1,448,706 | Daley | Mar. 13, 1923 |
| 1,489,471 | Tilton | Apr. 8, 1924 |
| 1,513,921 | Menefee | Nov. 4, 1924 |
| 1,621,425 | Meek | Mar. 15, 1927 |
| 1,935,685 | White | Nov. 21, 1933 |
| 2,060,754 | Davis | Nov. 10, 1936 |
| 2,125,856 | DeWitt | Aug. 2, 1938 |
| 2,144,300 | Stryker, Jr. | Jan. 17, 1939 |
| 2,224,972 | Long, Jr., et al. | Dec. 17, 1940 |
| 2,271,899 | Miller | Feb. 3, 1942 |

FOREIGN PATENTS

| Number | Country | Date |
|---|---|---|
| 63 | Great Britain | 1896 |
| 27,352 | Great Britain | 1911 |